Sept. 22, 1959   L. H. FLORA   2,904,820
CLOSURE CHECK OR THE LIKE
Filed June 11, 1956

INVENTOR
LAURENCE H. FLORA

BY  H. G. Lombard
ATTORNEY

United States Patent Office 2,904,820
Patented Sept. 22, 1959

2,904,820

CLOSURE CHECK OR THE LIKE

Laurence H. Flora, Cleveland, Ohio, assignor to Tinnerman Products, Inc., Cleveland, Ohio, a corporation of Ohio Application June 11, 1956, Serial No. 590,443

9 Claims. (Cl. 16—86)

This invention relates to articles which are used as closure checks and similar buffer and anti-rattle devices for taking up clearances between adjacent members of an assembly, for example.

A primary object of the invention is to provide an improved device of this character comprising a resilient plastic or rubber body or head united to a sheet metal fastener provided with clip means for self attachment of the device and/or means for threadedly engaging a bolt or screw in providing a relatively strong, durable and positive attachment of the device in operative position.

A further object of the invention is to provide such a device comprising a resilient plastic or rubber body or head combined with a sheet metal clip adapted to be easily and quickly applied to attached position and locked in such attached position against inadvertent displacement or removal.

Another object of the invention is to provide a device, as described, comprising a resilient plastic or rubber body or head moulded onto a sheet metal fastener provided with projecting tongues, or the like, adapted to threadedly engage a bolt or screw for securing the device in operative position in an assembly, with said projecting tongues, or the like, otherwise serving as anchoring means interconnected with the plastic or rubber body or head and preventing separation thereof from the sheet metal fastener in the use of the device.

A further object of the invention is to provide such a device in which the plastic or rubber body or head thereof is molded onto the sheet metal fastener in interconnected relation with said projecting tongues, or the like, together with an axial bore for receiving a cooperating bolt or screw threadedly engaged with said tongues in securing the device in an assembly, and with the plastic or rubber material surrounding said bore providing a locking action on said bolt or screw in the applied position thereof.

Further objects and advantages, and other new and useful features in the construction, arrangement and general combination of elements of the devices of the invention will be apparent as the following description proceeds with reference to the accompanying drawings, for purposes of illustration but not of limitation, in which like reference characters designate like parts throughout, and in which.

The devices of the invention are disclosed in connection with typical usages thereof as closure checks or buffers or anti-rattle devices, and the like, but it will be understood that the devices, otherwise, have a wide range and variety of applications and uses both as self-attached clip devices as well as devices provided with means adapted for self-locking threaded engagement with a bolt or screw in the manner of a spring nut, and with the plastic or rubber material of the body or head of the device providing, in addition, an automatic frictional locking action on the bolt or screw in applied position which prevents unintended loosening or removal of the bolt or screw under the most severe conditions of vibration, shock, and the like.

Figure 1:
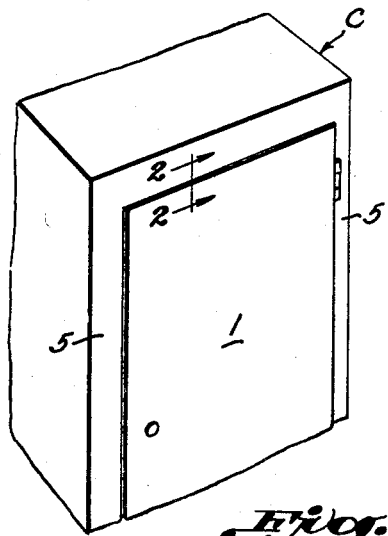
Fig. 1 is a perspective view of a portion of a cabinet, or the like, illustrating a typical usage of one form of the invention as a buffer or check for the door or closure of said cabinet.
Figure 2:
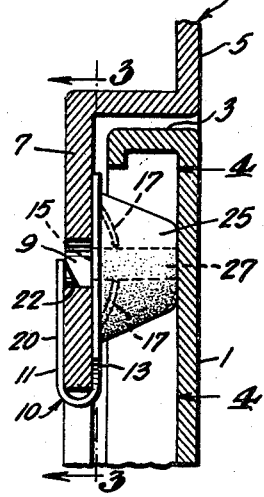
Fig. 2 is a sectional view along line 2—2 of Fig. 1, looking in the direction of the arrows, and shows a clip-type of device in accordance with the invention in self-attached operative position.

Referring now, more particularly, to the drawings, Figs. 1 and 2 show, by way of illustration only, a typical application of a clip-type of device in accordance with the invention, as employed as a closure check or bumper for the door or closure of a cabinet C or other receptacle. Such cabinets and similar receptacles are usually fabricated of stamped sheet metal panels and a widely used construction comprises a hinged door or closure 1 provided with a peripheral strengthening flange 3 and adapted to fit over an open area in the front panel 5 of the cabinet C, or the like. The open area in the front panel 5 is bordered by an inwardly offset marginal flange 7 defining a recess adapted to receive the hinged door 1 in closed position, as shown in Fig. 2, in substantially flush relation to the outer surface of said front panel 5 of said cabinet C. The marginal flange 7 is provided with an attaching opening 9 for each of the closure checks or buffer devices in accordance with the invention which are to be used in the completed assembly. Such an attaching opening 9 may be provided in any suitable outline, but preferably is formed as a simple circular opening which may be punched or drilled at the least possible cost.

The closure check, buffer or bumper device of the invention, designated generally 10, comprises a relatively simple, inexpensive sheet metal clip fastener 11 combined with a resilient plastic, such as vinyl chloride, or rubber body or head 25 molded onto the base 13 of said clip 11. A stud passage 15 is provided in said base 13 intermediate the extremities of a pair of cooperating tongues 17 projecting outwardly out of the plane of said base 13 in position to serve several important functions and purposes in the completed device 10, as presently to be described.

An attaching arm 20 on the device 10 is formed by a generally U-shaped return bent portion at one end of said base 13 and terminates substantially below and in line with the stud passage 15 in said base 13. The extremity of said attaching arm 20 is recessed in a manner to define a suitable sight opening and an adjacent locking projection or detent 22 projecting inwardly toward the base 13. Said detent 22 preferably is formed from a marginal edge portion of such sight opening to define a generally semicircular indexing or positioning element 22, Fig. 3, which snugly engages a portion of the wall of the attaching opening 9 in the flange 7 to retain the device 10 in attached position thereon. The locking detent 22 preferably has its upper edge surface tapered generally outwardly toward the free end of the attaching arm 20 to define an inclined cam surface which provides a flared opening between said arm 20 and said base 13 of the sheet metal clip 11.

Figure 5:
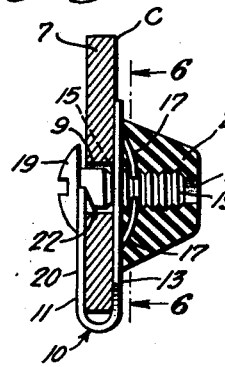
Fig. 5 is a sectional view showing the supporting part of Fig. 2 with the clip-type of device in accordance with the invention attached thereto and positively secured by a bolt or screw in an alternate arrangement; and, Fig. 6 is a sectional view of Fig. 5 on line 6—6, looking in the direction of the arrows.

The cooperating tongues 17 define thread elements for threadedly engaging a bolt or screw 19, Fig. 5, and in this regard, said tongues 17 are best provided from the sheet metal material of said base 13 by the stud passage 15 intermediate a pair of spaced parallel slits which form said cooperating tongues 17, or the like, having spaced extremities defining the desired thread or thread opening corresponding substantially to the root diameter of said bolt or screw 19 for threadedly engaging the thread thereof. Said tongues 17, otherwise, are preferably formed to project outwardly out of the plane of the base 13 and are bent lengthwise in substantial ogee formation to provide for the maximum strength obtainable to withstand the tightening action of the bolt or screw 19 as it is advanced to applied fastening position.

Such tongues 17 or similar stud engaging means may be pressed, stamped, extruded, or otherwise provided on the fastener base 13 in any suitable form or construction so long as the same threadedly engage with the thread of the bolt or screw 19 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the wall thereof tapped for threadedly engaging said bolt or screw 19. However, thread engaging elements prepared in the form of cooperating, resilient tongues 17 as shown, are possessed of unusual inherent strength and will not collapse or pull through when the bolt or screw 19 is tightened, nor loosen under continuous strain and vibration in the assembly. This takes place by reason of the fact that the sheet metal material from which such tongues 17 are formed is of less thickness than the pitch or spacing between adjacent thread convolutions of the bolt or screw 19, wherefore the extremities of said tongues 17 tend, more effectively, to move toward each other and dig into the grooves intermediate adjacent thread convolutions of the bolt or screw 19 when tightened, and otherwise become embedded in the root of the bolt or screw 19 in locked, frictional fastening engagement therewith, thereby providing an automatic thread lock on said screw or bolt 19 in any tightened position thereof which prevents accidental loosening thereof under the most severe conditions of vibration, or the like. Thus, in the present example, the tongues 17 are shown as extending out of the plane of the base 13 in substantially ogee formation and provided preferably with arcuately notched extremities, forming substantial biting jaws adapted to dig into the root diameter of the bolt or screw 19 and the adjacent thread surfaces thereon in positive locking relation therewith in the most effective manner.

The plastic or rubber head or body 25 is provided in a cone-shaped formation molded directly onto the outer surface of the base 13 with the tongues 17 or similar elements embedded therein in such a way that said tongues 17 are completely surrounded by plastic or rubber material at both the upper and lower faces of said tongues 17, as shown in Figs. 2 and 5. The tongues 17 thus serve as anchoring or reinforcing means uniting the plastic or rubber body or head 25 to the base 13 in a strong and durable connection by which said plastic body or head 25 cannot separate from said sheet metal base 13 under the most severe service conditions.

Figure 6:
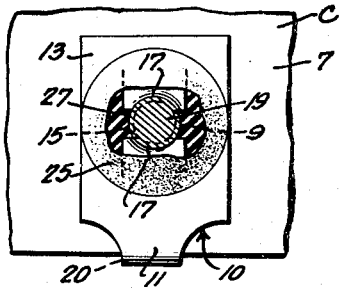
Figure 4:
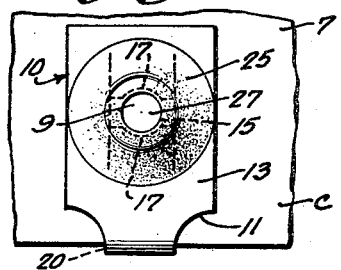
Fig. 4 is a sectional view of Fig. 2 on line 4—4, looking in the direction of the arrows.

The plastic or rubber body or head 25, as thus bonded to the sheet metal base 13, is molded with an axial bore 27 in concentric aligned relation to the stud passage 15 in said base 13 provided by the space between the extremities of said tongues 17. As seen in Fig. 4, the wall of said bore 27 corresponds substantially to and preferably is slightly smaller than the thread opening defined by said spacing between the extremities of said tongues 17. Thus, the diameter of said bore 27 is materially smaller than the diameter of the crests of the thread convolutions on the bolt or screw 19. Accordingly, when said bolt or screw 19 is threadedly engaged with the extremities of the tongues 17, as shown in Figs. 5 and 6, said thread convolutions are forced to cut into the surrounding plastic or rubber material of said bore 27 and otherwise expand the wall of said bore 27 as necessary for the bolt or screw 19 to advance to its fully applied fastening position. Such expansion of the bore 27 necessarily tensions the surrounding plastic or rubber material in frictional gripping engagement with the thread surfaces of the bolt or screw 19 to provide an automatic resilient locking action thereon supplementary to and cooperating with the thread locking action of the tongues 17 in tensioned threaded engagement with the bolt or screw 19, as aforesaid.

Figure 3:
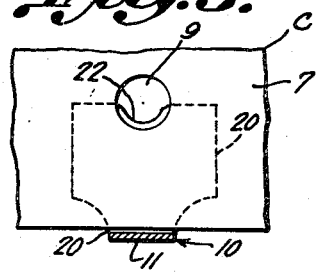
Fig. 3 is a sectional view of Fig. 2 on line 3—3, looking in direction of the arrows.

The completed device 10, thus provided, is easily and quickly applied to attached position over the opening 9 in the flange 7, as shown in Fig. 2, simply by arranging the clip portion 11 thereof in position for the attaching arm 20 to clasp the inner side of said flange 7 in cooperation with the base 13 clasping the outer side of said flange 7. Preferably, the normal spacing of the attaching arm 20 from the base 13 is slightly less than the thickness of the flange 7 such that said attaching arm 20 must be spread slightly outwardly over the edge of said flange 7. The device 10 is then pushed to the fully attached operative position shown in Figs. 2 and 5 in which the base 13 and attaching arm 20 resiliently clasp opposite sides of said flange 7. The inclined cam surface on the locking detent 22 defines a flared entrance between the base 13 and the attaching arm 20 which facilitates the initial application thereof to the flange 7 by causing a gradual outward camming of said arm 20 as necessary to clear the edge of said flange 7 easily and quickly. The recess on the end of the attaching arm 20 leaves the opening 9 in the flange 7 uncovered and fully visible such that this recess serves as a sight opening by which the attaching arm 20 of the device may be guided readily, in the least amount of time and effort, to the proper location in which the locking detent 22 thereon snaps into said opening 9 in the final attached position thereof on said flange 7, substantially as shown in Figs. 2 and 5. The locking detent 22 preferably is semicircular, and thereby snugly engages the adjacent curved edge portion of the attaching opening 9, as best seen in Fig. 3, to lock the device 10 firmly and rigidly in attached position on said flange 7 with the plastic or rubber head 25 in position to serve as a buffer, bumper or check for the door or closure 1 of the cabinet C, Figs. 1 and 2.

As thus attached, the clip-type of device 10 is self-retainer in operative position on the apertured flange 7 by the clip fastening means thereof defined by the attaching arm 20 and detent 22. The arrangement is such that the clip-type of device 10, as so employed, is complete in itself and adapted for a wide range and variety of applications and uses as a self-retained closure check, buffer or anti-rattle device, or the like.

In many applications, it is necesary or desirable to use a bolt or screw 19 to secure the device 10, as shown in Figs. 5 and 6, in a positive attachment on its supporting flange 7. In this regard, a combination of locking and reinforcing features is provided by the bolt or screw 19 as threadedly engaged with the tongues 17 in a tensioned thread locking action together with the frictional and gripping locking action on the thread surfaces of said bolt or screw 19 as forcibly threaded into the bore 27 in the plastic or rubber body or head 25 in a manner whereby said bolt or screw 19 serves, in addition, to reinforce and support said plastic or rubber body or head 25 against deformation or distortion under the most severe service conditions intended.

Figure 7:
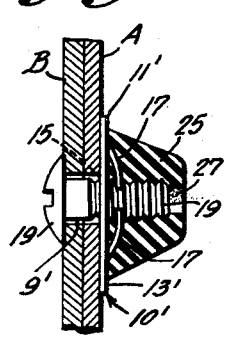
Fig. 7 is a sectional view showing another form of device in accordance with the invention as employed with a bolt or screw for securing two or more parts of an assembly while also serving as a check, buffer or anti-rattle device, or the like, and with the bolt or screw locked in applied position by the plastic or rubber material of the body or head of the device.

In the use of a bolt or screw 19 for securing the device 10, Figs. 5 and 6, or for fastening the similar device 10', Fig. 7, said bolt or screw 19 is threaded with the tongues 17 in the usual manner and when drawn up in the fully applied tightened position thereof, said tongues 17 are tensioned in an automatic spring locking action with the thread on said bolt or screw 19 to lock the same in applied position, as described in the foregoing. At the same time, the bolt or screw 19 is forcibly threaded into the smaller size bore 27 in the plastic or rubber body or head 25 which provides an automatic frictional and gripping engagement on the thread surfaces on said bolt or screw 19. Thus, the bolt or screw 19 is locked in applied position by both the thread locking action of the tongues 17 in tensioned engagement with the thread thereon and the frictional gripping engagement of the plastic or rubber material surrounding the bore 27 with the thread surfaces on said bolt or screw 19. The arrangement, accordingly, is in the nature of an advantageous double locking action on the bolt or screw 19 which prevents any possible unintended loosening or removal thereof from its applied fastening position.

Fig. 7 shows another form of the invention in which a simplified type of device 10', likewise, is secured by a bolt or screw 19 which reinforces and supports the plastic or rubber body or head 25 against deformation or distortion together with the aforesaid double locking action on the bolt or screw 19 provided by the tongues 17 in spring tensioned thread locking relation therewith and the frictional, gripping engagement of the plastic or rubber material surrounding the bore 27 with the thread surfaces on said bolt or screw 19. The device 10' comprises a similar sheet metal fastener 11' defining a base in the form of a simple flat plate 13' provided with a passage 15 intermediate a pair of integral tongues 17 serving as means for anchoring the plastic or rubber body or head 25 on said base 13' and means for threadedly engaging the bolt or screw 19, substantially as described with reference to the form of the invention disclosed in Figs. 1–6, inclusive. Such a device is advantageously used in applications requiring a combined bumper and spring nut, or the like, for securing two or more parts A, B, Fig. 7, for example, having aligned holes defining a work opening 9' for the bolt or screw 19 applied to said tongues 17 to secure said parts A, B, in a completed assembly, with the plastic or rubber body or head 25 in position to serve as a closure check, bumper or anti-rattle device, or the like.

Each of the disclosed devices in accordance with the invention is complete in itself and readily adapted for a wide range and variety of applications and uses for the purposes described as well as in securing any two or more superposed or juxtaposed parts of an assembly by a bolt or screw 19 under a double locking action, as aforesaid. In such applications, if desired, the bolt or screw 19 may be of such length as to project beyond the plastic body or head 25 for any added strength that may be necessary or desirable; in other instances, the bolt or screw 19 is short enough for the leading end thereof to be concealed within the plastic or rubber body or head 25 as suitable for said plastic or rubber body or head 25 to serve as a resilient closure check, buffer or anti-rattle device, or the like. In this regard, when the devices 10 or 10' are used as securing devices with bolts or screws 19 short enough to be concealed within the plastic or rubber body or head 25 thereof, as shown in Figs. 5 and 7, respectively, said plastic or rubber body or head 25 advantageously serves, in addition, as a protective cap or cover over the leading end of the bolt or screw 19 is often required in assemblies wherein it is necessary to guard against possible damage or injury from the sharp edges and points on the ends of bolts and screws in secured position in a completed installation.

The sheet metal fastener member in any form of the invention preferably is constructed of relatively thin sheet metal the thickness of which is selected according to service requirements and the predetermined size of the completed device. The sheet metal fastener member is most effective when provided of spring metal suitably tempered and otherwise treated to give the desired toughness and hardness, particularly in the case of devices intended for heavy duty applications. A cheap and highly satisfactory sheet metal fastener member may be provided from cold rolled metal such as cold rolled steel which is untempered but of a spring metal nature and capable of providing an effective and reliable device in accordance with the invention.

While the invention has been described in detail with specific examples, such examples are intended as illustrations only inasmuch as the invention fully contemplates various modifications which may be provided without departing from the spirit and scope of the invention.

What is claimed is:

1. In a closure assembly or the like comprising a part having a flange provided with an opening and a closure adapted for abutting relation with said flange, a closure check comprising a sheet metal member defining a base and a resilient member molded onto said base, elements on said base projecting out of the plane thereof in embedded relation in said resilient member and anchoring the same to said base, a return bent portion on said base defining an underlying arm adapted to cooperate with said base in attaching the closure check to said flange over said opening therein with said resilient member in position to engage said closure, said elements on said base comprising spaced tongues adapted to threadedly engage fastening means, such as a bolt or screw, for securing the closure check to said flange.

2. A device of the kind described comprising a sheet metal member defining a base having a passage therein, a resilient member molded onto the outer side of said base around said passage, elements on said base projecting out of the plane thereof in embedded relation in said resilient member and anchoring the same to said base, said elements comprising spaced tongues adapted to threadedly engage attaching means, such as a bolt or screw for securing the device to a supporting part with the underside of said base bearing on said supporting part.

3. A device of the kind described comprising a sheet metal member defining a base having a passage therein, a resilient member molded onto the outer side of said base and positioned over said passage, elements on said base projecting out of the plane thereof in embedded relation in said resilient member and anchoring the same to said base, a return bent portion on said base defining an arm at the underside of said base adapted to cooperate with said base in attaching the device to a supporting part over an opening therein, and a detent on said arm receivable in said opening to retain the device in attached position on said supporting part, said elements on said base comprising spaced tongues adapted to threadedly engage attaching means such as a bolt or screw for securing the device to said supporting part.

4. A device of the kind described comprising a sheet metal member defining a base having a passage for a threaded member such as a bolt or screw, a resilient member molded onto the outer side of said base and disposed over said passage and having an axial bore aligned with said passage, said axial bore being of such size that the threads of the threaded member must threadedly cut into and expand the defining surfaces of said bore when the threaded member is applied to secure the device to a supporting part, and means formed from said base, projecting out of the plane of the latter and embedded in anchored relation with said resilient member and adapted to threadedly engage said threaded member when applied to secure the device to said supporting part.

5. A device of the kind described comprising a sheet metal member defining a base having a passage for a threaded member such as a bolt or screw, a resilient member molded onto the outer side of said base around said passage and having an axial bore aligned with said passage, said axial bore being of such size that it must be expanded by the threaded member when applied to secure the device to a supporting part, spaced tongues on said base projecting out of the plane thereof in anchored relation with said resilient member and adapted to threadedly engage said threaded member when applied to secure the device to said supporting part.

6. A device of the kind described comprising a sheet metal member defining a base having a passage for receiving an attaching member such as a bolt or screw, a resilient member molded onto the outer side of said base around said passage and having an axial bore aligned with said passage, said axial bore being of such size that it must be expanded by the bolt or screw when applied to secure the device to a supporting part, elements on said base projecting out of the plane thereof in embedded relation in said resilient member and anchoring the same to said base, and means extending from said base for attaching the device to a supporting part, said means comprising a return bent portion defining an arm adapted to cooperate with said base in attaching the device to said supporting part over an opening therein.

7. A device of the kind described comprising a sheet metal member defining a base having a passage for an attaching member such as a bolt or screw, a resilient member molded onto the outer side of said base over said passage and having an axial bore aligned with said passage, said axial bore being of such size that it must be expanded by the bolt or screw when applied to secure the device to a supporting part, elements on said base projecting out of the plane thereof in embedded relation with said resilient member and anchoring the same to said base, a return bent portion on said base defining an arm at the underside of said base adapted to cooperate therewith in attaching the device to a supporting part over an opening therein, a detent on said arm receivable in said opening to retain the device in attached position on said supporting part, said elements on said base comprising spaced tongues adapted to threadedly engage said attaching member when applied to secure the device to said supporting part.

8. In a closure assembly or the like, comprising a part having a flange provided with an opening and a closure adapted for abutting relation with said flange, a closure check comprising a sheet metal member defining a base and a resilient member molded onto one side of said base, elements on said base projecting out of the plane thereof in imbedded relation in said resilient member and anchoring the same to said base, said elements on said base comprising spaced tongues adapted to threadedly engage attaching means, such as a bolt or screw, for securing the closure check to said flange over said opening therein, with the other side of said base engaging said flange and said resilient member in position to engage said closure.

9. A device of the kind described comprising a sheet metal member defining a base having a passage therein, a relatively resilient member molded onto the outer side of said base around said passage, elements on said base projecting out of the plane thereof in imbedded relation in said resilient member and anchoring the same to said base, and means extending from said base for attaching the device to a supporting part, said elements on said base comprising spaced tongues, said tongues and said means adapted to engage a threaded member such as a bolt or screw for securing the device to said supporting part.

References Cited in the file of this patent

UNITED STATES PATENTS

| Re. 21,769 | Tinnerman | Apr. 8, 1941 |
| 1,563,876 | Smith | Dec. 1, 1925 |
| 1,908,839 | Greig | May 16, 1933 |
| 2,054,471 | Tinnerman | Sept. 15, 1936 |
| 2,417,262 | Morehouse | Mar. 11, 1947 |
| 2,417,263 | Morehouse | Mar. 11, 1947 |